United States Patent
Ravich et al.

(10) Patent No.: US 11,586,569 B2
(45) Date of Patent: Feb. 21, 2023

(54) SYSTEM AND METHOD FOR POLLING-BASED STORAGE COMMAND PROCESSING

(71) Applicant: EMC IP Holding Company, LLC, Hopkinton, MA (US)

(72) Inventors: Leonid Ravich, Raanana (IL); Eldad Zinger, Raanana (IL); Amit Engel, Tel Aviv (IL)

(73) Assignee: EMC IP Holding Company, LLC, Hopkinton, MA (US)

( * ) Notice: Subject to any disclaimer, the term of this patent is extended or adjusted under 35 U.S.C. 154(b) by 0 days.

(21) Appl. No.: 17/383,604

(22) Filed: Jul. 23, 2021

(65) Prior Publication Data

US 2023/0025907 A1   Jan. 26, 2023

(51) Int. Cl.
*G06F 13/24* (2006.01)
*G06F 13/10* (2006.01)

(52) U.S. Cl.
CPC ............ *G06F 13/24* (2013.01); *G06F 13/102* (2013.01)

(58) Field of Classification Search
CPC .............................. G06F 13/24; G06F 13/102
See application file for complete search history.

(56) References Cited

U.S. PATENT DOCUMENTS

2005/0172043 A1* 8/2005 Nonaka .................. G06F 3/067
710/5

FOREIGN PATENT DOCUMENTS

KR         2007019136 A  *  2/2007

* cited by examiner

*Primary Examiner* — Glenn A. Auve
(74) *Attorney, Agent, or Firm* — Brian J. Colandreo; Mark H. Whittenberger; Holland & Knight LLP (57) ABSTRACT

A method, computer program product, and computing system for assigning a first set of interrupts for exclusive processing by a first set of central processing units (CPU) cores. A second set of interrupts may be assigned for processing by a second set of CPU cores. The first set of interrupts may be processed using the first set of CPU cores. The second set of interrupts may be converted to a set of polling operations, thus defining a set of converted polling operations. The set of converted polling operations may be processed using the second set of CPU cores.

20 Claims, 4 Drawing Sheets

SYSTEM AND METHOD FOR POLLING-BASED STORAGE COMMAND PROCESSING

BACKGROUND

Storing and safeguarding electronic content may be beneficial in modern business and elsewhere. Accordingly, various methodologies may be employed to communicate data to and from storage arrays more efficiently.

For example, Fibre Channel is a data transfer protocol for computing devices that utilizes interrupts for the processing of storage commands to reduce latency. Typical Fibre Channel configurations include the rigid allocation of CPU cores between storage application(s) and Fibre Channel interrupt processing. For example, a storage application is usually not flexible enough to support soft CPU core assignment, so hard assignment is required. Since the storage logic is implemented by the storage application, the tendency is to assign as many CPU cores to the storage application and just-as-needed for processing Fibre Channel interrupts. However, Fibre Channel interrupts may compete with storage application-based polling for CPU cycles. As such, unmanaged competition between processing polling operations and interrupts decreases the efficiency of CPU utilization.

SUMMARY OF DISCLOSURE

In one example implementation, a computer-implemented method executed on a computing device may include but is not limited to assigning a first set of interrupts for exclusive processing by a first set of central processing units (CPU) cores. A second set of interrupts may be assigned for processing by a second set of CPU cores. The first set of interrupts may be processed using the first set of CPU cores. The second set of interrupts may be converted to a set of polling operations, thus defining a set of converted polling operations. The set of converted polling operations may be processed using the second set of CPU cores.

One or more of the following example features may be included. Converting the second set of interrupts to a set of polling operations may include preventing the second set of interrupts from being processed as interrupts; and storing each interrupt of the second set of interrupts as a polling operation on one or more buffers. Processing the set of converted polling operations using the second set of CPU cores may include polling the set of converted polling operations from the one or more buffers using the second set of CPU cores. The first set of interrupts and the second set of interrupts include one or more interrupts associated with Fibre Channel protocol transport layer. The first set of interrupts include one or more IO command interrupts. The second set of interrupts include at least one of: one or more backend submission command interrupts; and one or more transaction completion interrupts. It may be determined whether an IO command interrupt is associated with a read command or a write command. In response to determining that the IO command interrupt is associated with a read command, the read command interrupt may be converted to a polling operation. In response to determining that the IO command interrupt is associated with a write command, the write command interrupt may be processed using the first set of CPU cores.

In another example implementation, a computer program product resides on a computer readable medium that has a plurality of instructions stored on it. When executed by a processor, the instructions cause the processor to perform operations that may include but are not limited to assigning a first set of interrupts for exclusive processing by a first set of central processing units (CPU) cores. A second set of interrupts may be assigned for processing by a second set of CPU cores. The first set of interrupts may be processed using the first set of CPU cores. The second set of interrupts may be converted to a set of polling operations, thus defining a set of converted polling operations. The set of converted polling operations may be processed using the second set of CPU cores.

One or more of the following example features may be included. Converting the second set of interrupts to a set of polling operations may include preventing the second set of interrupts from being processed as interrupts; and storing each interrupt of the second set of interrupts as a polling operation on one or more buffers. Processing the set of converted polling operations using the second set of CPU cores may include polling the set of converted polling operations from the one or more buffers using the second set of CPU cores. The first set of interrupts and the second set of interrupts include one or more interrupts associated with Fibre Channel protocol transport layer. The first set of interrupts include one or more IO command interrupts. The second set of interrupts include at least one of: one or more backend submission command interrupts; and one or more transaction completion interrupts. It may be determined whether an IO command interrupt is associated with a read command or a write command. In response to determining that the IO command interrupt is associated with a read command, the read command interrupt may be converted to a polling operation. In response to determining that the IO command interrupt is associated with a write command, the write command interrupt may be processed using the first set of CPU cores.

In another example implementation, a computing system includes at least one processor and at least one memory architecture coupled with the at least one processor, wherein the at least one processor is configured to assign a first set of interrupts for exclusive processing by a first set of central processing units (CPU) cores. The at least one processor may be further configured to assign a second set of interrupts for processing by a second set of CPU cores. The at least one processor may be further configured to process the first set of interrupts using the first set of CPU cores. The at least one processor may be further configured to convert the second set of interrupts to a set of polling operations, thus defining a set of converted polling operations. The at least one processor may be further configured to process the set of converted polling operations using the second set of CPU cores.

One or more of the following example features may be included. Converting the second set of interrupts to a set of polling operations may include preventing the second set of interrupts from being processed as interrupts; and storing each interrupt of the second set of interrupts as a polling operation on one or more buffers. Processing the set of converted polling operations using the second set of CPU cores may include polling the set of converted polling operations from the one or more buffers using the second set of CPU cores. The first set of interrupts and the second set of interrupts include one or more interrupts associated with Fibre Channel protocol transport layer. The first set of interrupts include one or more IO command interrupts. The second set of interrupts include at least one of: one or more backend submission command interrupts; and one or more transaction completion interrupts. It may be determined whether an IO command interrupt is associated with a read command or a write command. In response to determining that the IO command interrupt is associated with a read command, the read command interrupt may be converted to a polling operation. In response to determining that the IO command interrupt is associated with a write command, the write command interrupt may be processed using the first set of CPU cores.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
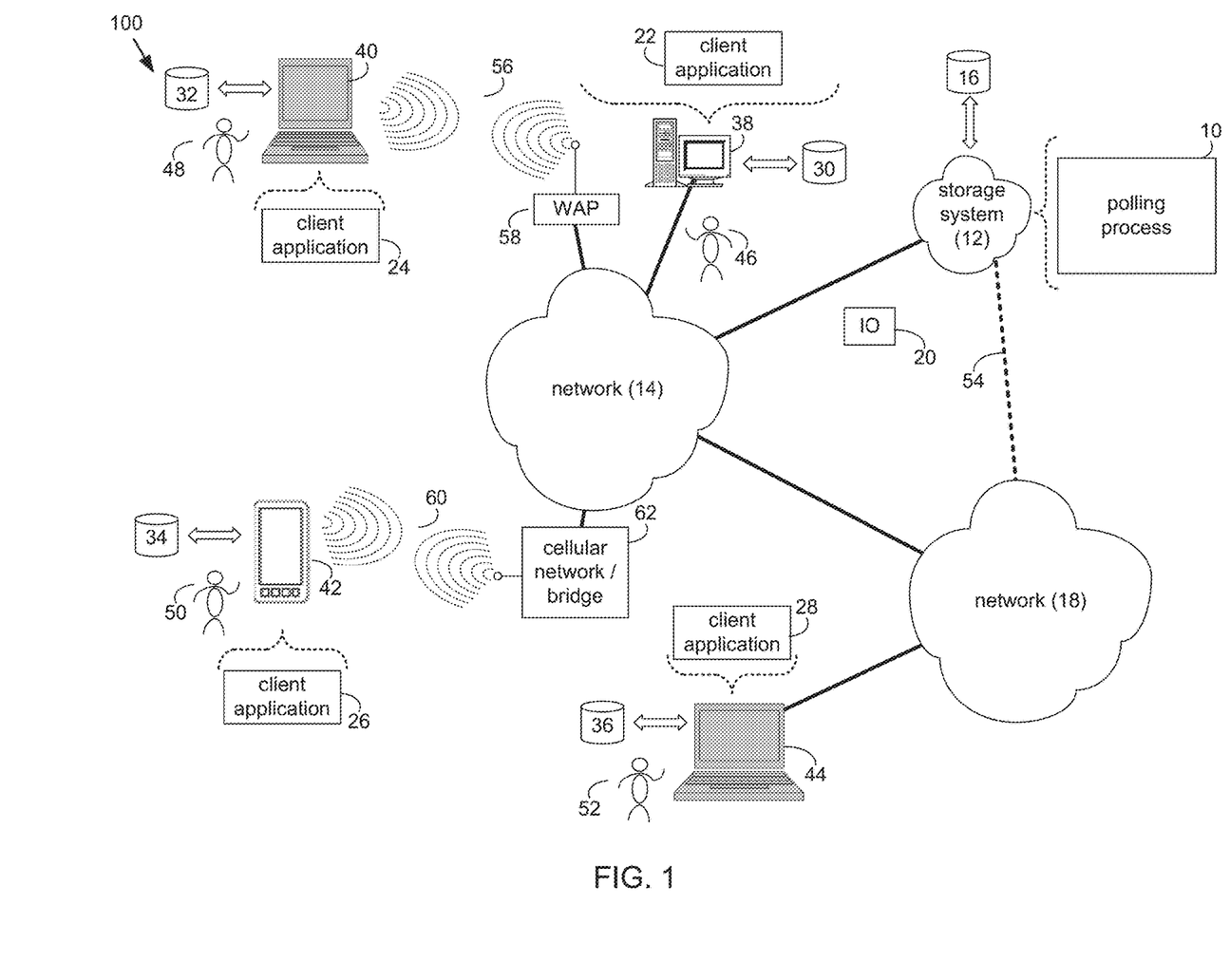
FIG. 1 is an example diagrammatic view of a storage system and a polling process coupled to a distributed computing network according to one or more example implementations of the disclosure.

System Overview:

Referring to FIG. 1, there is shown polling process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS™, Blackberry® OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of polling process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of polling process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi®, and/or Bluetooth® device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome Blackberry® OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a process, such as polling process 10 of FIG. 1, may include but is not limited to, assigning a first set of interrupts for exclusive processing by a first set of central processing units (CPU) cores. A second set of interrupts may be assigned for processing by a second set of CPU cores. The first set of interrupts may be processed using the first set of CPU cores. The second set of interrupts may be converted to a set of polling operations, thus defining a set of converted polling operations. The set of converted polling operations may be processed using the second set of CPU cores.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
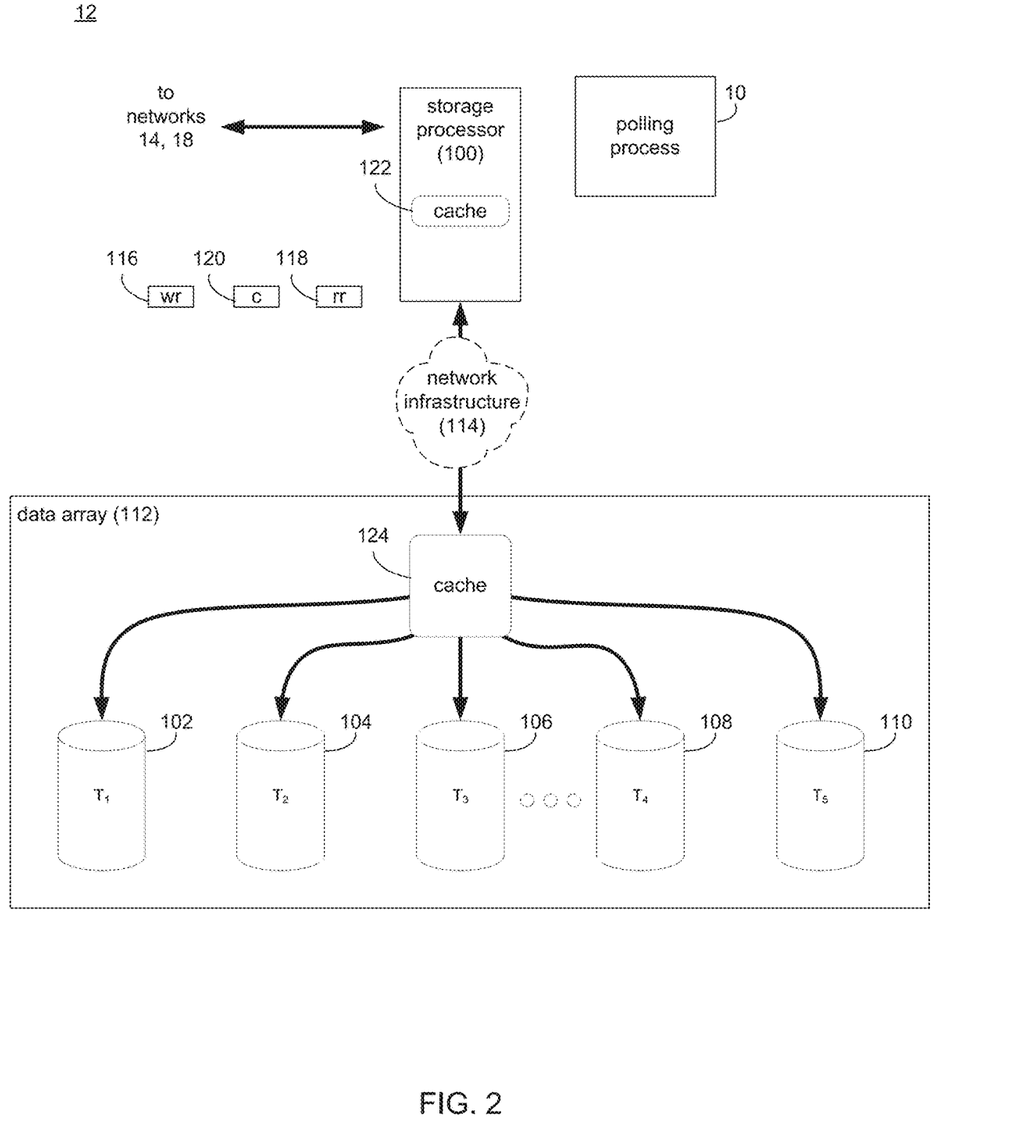
FIG. 2 is an example diagrammatic view of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of polling process 10. The instruction sets and subroutines of polling process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of polling process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of polling process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of polling process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

Figure 3:
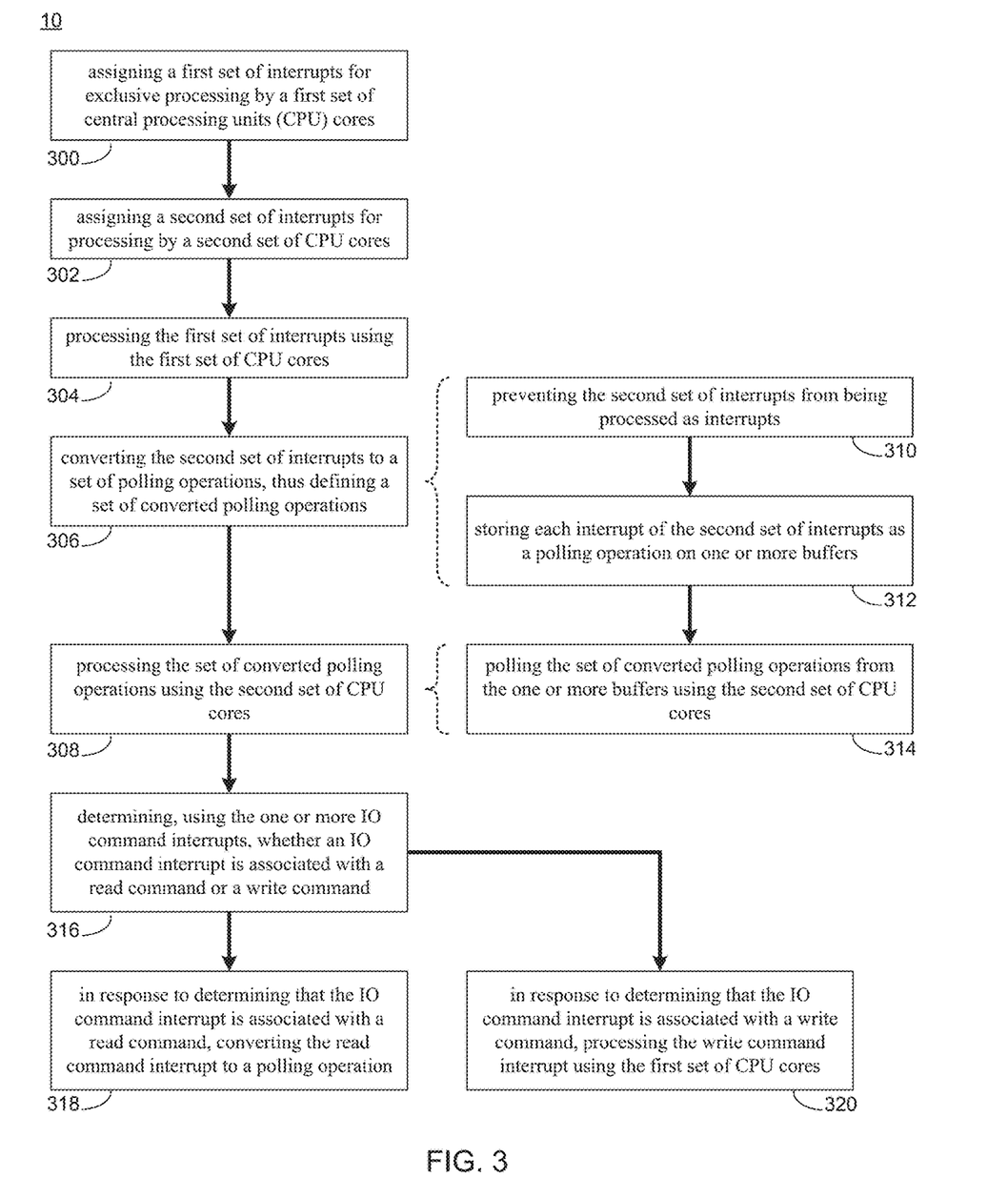
FIG. 3 is an example flowchart of the polling process of FIG. 1 according to one or more example implementations of the disclosure.
Figure 4:
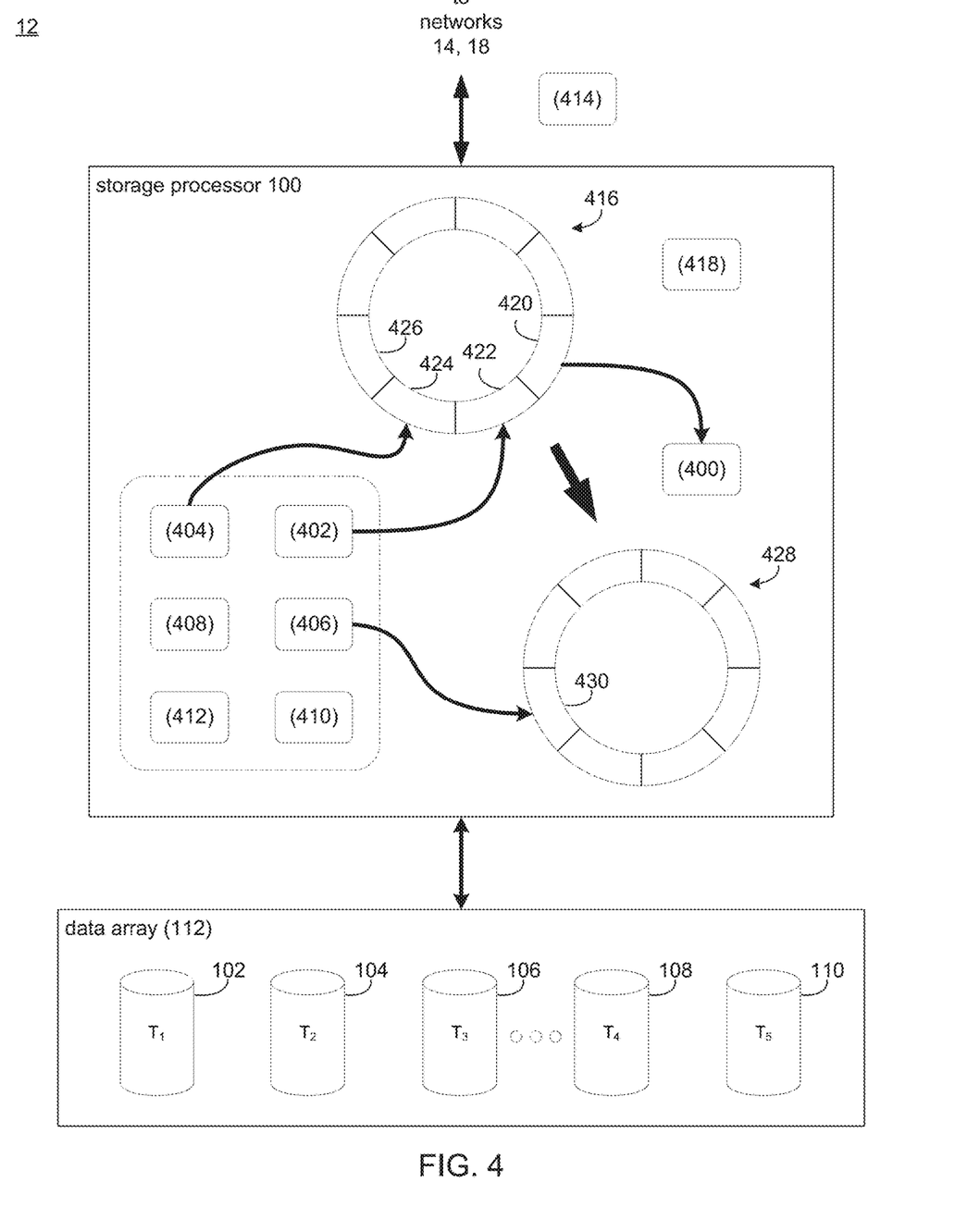
FIG. 4 is an example diagrammatic view of the polling process of FIG. 1 according to one or more example implementations of the disclosure.

The Polling Process:

Referring also to FIGS. 3-4 and in some implementations, polling process 10 may assign 300 a first set of interrupts for exclusive processing by a first set of central processing units (CPU) cores. A second set of interrupts may be assigned 302 for processing by a second set of CPU cores. The first set of interrupts may be processed 304 using the first set of CPU cores. The second set of interrupts may be converted 306 to a set of polling operations, thus defining a set of converted polling operations. The set of converted polling operations may be processed 308 using the second set of CPU cores.

As will be discussed in greater detail below, implementations of the present disclosure may allow for more efficient processing of storage commands in a storage system using Fibre Channel. For example, Fibre Channel is a data transfer protocol for computing devices. Fibre Channel utilizes interrupts for the processing of storage commands to reduce latency. Typical Fibre Channel configurations include the rigid allocation of CPU cores between storage application(s) and Fibre Channel interrupt processing. For example, a storage application is usually not flexible enough to support soft CPU core assignments, so hard assignment is required. Since the storage logic is implemented by the storage application, the tendency is to assign as many CPU cores to the storage application and just-as-needed for processing Fibre Channel interrupts. However, Fibre Channel interrupts may compete with storage application-based polling for CPU cycles. As such, unmanaged competition between processing polling operations and interrupts decreases the efficiency of CPU utilization. As will be discussed in greater detail below, polling process 10 may convert certain Fibre Channel interrupts to polling operations to allow more CPU cores to be assigned for processing both storage application-based polling operations and converted polling operations. In this manner, polling process 10 may increase the CPU utilization of storage systems using Fibre Channel without increasing IO latency.

In some implementations, polling process 10 may assign 300 a first set of interrupts for exclusive processing by a first set of central processing units (CPU) cores. Referring also to FIG. 4, a storage processor (e.g., storage processor 100) may include a plurality of CPU cores of a multi-core processor. As is known in the art, a multi-core processor may generally include a computer processor on a single integrated circuit with two or more separate processing units, called cores, each of which reads and executes program instructions. As shown in FIG. 4, storage processor may include a multi-core processor with a plurality of CPU cores (e.g., CPU cores 400, 402, 404, 406, 408, 410, 412). While FIG. 4 includes e.g., six CPU cores, it will be appreciated that this is for example purposes only and that storage processor 100 may include any number of CPU cores within the scope of the present disclosure.

Storage processor 100 may be communicatively coupled to one or more host computing devices that are configured to send a plurality of IO requests to storage processor 100. The plurality of CPU cores of storage processor 100 may process the various IO requests received. In some implementations, storage processor 100 and the one or more host computing devices may be communicatively coupled via Fibre Channel protocol. As is known in the art, Fibre Channel is a high-speed data transfer protocol providing in-order, lossless delivery of raw block data. Fibre Channel is primarily used to connect computer data storage to servers in storage area networks (SAN) in commercial data centers but may be adapted for various configurations. Fibre Channel may allow for communication between computing devices using interrupts and polling operations. For example, polling process 10 may process particular latency-critical events using an interrupt (e.g., when a write request is received at storage processor 100). In this manner, CPU cores may interrupt their regular processing, such as polling operation, to process an interrupt. To avoid CPU contention, polling process 10 may assign 300 a first set of interrupts for exclusive processing by a first set of CPU cores.

Referring again to FIG. 4, storage processor 100 may include a plurality of CPU cores (e.g., CPU cores 400, 402, 404, 406, 408, 410, 412) configured to process data within storage system 12. In some implementations, storage processor 100 may receive a plurality of IO requests (e.g., IO request 414) via Fibre Channel communication with one or more hosts on one or more buffers (e.g., buffer 416). As shown in FIG. 4, buffer 416 may be a ring buffer or any type of data structure configured to buffer data. Additionally, it will be appreciated that any number of buffers may be used within the scope of the present disclosure (e.g., one or more buffers per storage processor, one or more buffers per Fibre Channel port of the storage processor, etc.).

From the one or more buffers, interrupt handling drivers within storage processor 100 (e.g., interrupt handling driver 418) may determine whether to process the IO request received at the one or more buffers (e.g., buffer 416) as an interrupt. Otherwise, polling process 10 may retain the IO request within buffer 416 for polling by the CPU cores. As will be discussed in greater detail below, polling process 10 may, via storage processor 100, generate various interrupts and/or polling operations when processing IO requests. In some implementations, the one or more buffers may be generally referred to as the "frontend" of storage processor 100 where frontend processing of data within storage processor 100 occurs.

As discussed above, storage processor 100 may receive a plurality of IO requests via Fibre Channel communication with one or more hosts on one or more buffers. Polling process 10 may assign 300 a first set of interrupts or first type of interrupt for exclusive processing by a first set of CPU cores. The first set of interrupts may include one or more IO command interrupts. An IO command interrupt may generally include an interrupt generated in response to receiving an IO command. As the processing of certain IO requests, primarily write requests, are critical for reducing storage system latency, polling process 10 may provide for expedient processing of these particular IO commands via an interrupt. However, not all IO commands are latency critical. Accordingly and as will be discussed in greater detail below, polling process 10 may assign 300 IO command interrupts for exclusive, initial processing by a first set of CPU cores. If the IO command is a write operation, polling process 10 may process the write command interrupts using the first set of CPU cores. If the IO command is a read operation, polling process 10 may process the read command as a polling operation using a different set of cores (e.g., a second set of CPU cores).

In some implementations, polling process 10 may assign 302 a second set of interrupts for processing by a second set of CPU cores. As discussed above, not all Fibre Channel interrupts conventionally generated by a storage processor are latency critical. For example, various interrupts generated by a storage system can be processed in parallel with other data processing operations without requiring processing by exclusively assigned CPU cores. In some implementations, the second set of interrupts may include at least one of: one or more backend submission command interrupts; and one or more transaction completion interrupts.

For example, when processing either a read command or a write command, polling process 10 may, via storage processor 100, generate a backend submission command interrupt. A backend submission command interrupt may generally include an interrupt for indicating that data has been received at the frontend of the storage processor and is being submitted to an IO queue for processing by the backend of a storage processor (i.e., portion of storage processor that interfaces with storage devices). Because the actual processing of the data submitted to the IO queue will only be handled by a CPU core polling the IO queue, the backend submission command interrupt does not impact IO latency. As will be discussed in greater detail below, as the backend submission command interrupt does not impact IO latency, polling process 10 may convert the backend submission command interrupt to a polling operation and allow for CPU cores to poll this operation.

Additionally, when processing either a read command or a write command, polling process 10 may, via storage processor 100, generate a transaction completion interrupt. A transaction completion interrupt may generally include an interrupt for indicating that the processing of the IO request is complete on the backend of the storage processor and that any resources by the frontend for processing this IO request may be freed or released for new IO requests. Because the IO request has been processed by time the transaction completion interrupt is received, the transaction completion interrupt does not impact IO latency. As will be discussed in greater detail below, as the transaction completion interrupt does not impact IO latency, polling process 10 may convert the transaction completion interrupt to a polling operation and allow for CPU cores to poll this operation.

Referring again to FIG. 4, polling process 10 may assign 300 a first set of interrupts for processing by a first set of CPU cores (e.g., CPU core 400). As discussed above, polling process 10 may assign 300 IO command interrupts for exclusive, initial processing by a first set of CPU cores. Accordingly, the number of CPU cores assigned 300 for exclusive processing of the first set of interrupts may be reduced over conventional approaches where all interrupts are assigned to a greater number of CPU cores for exclusive processing. Polling process 10 may assign 302 a second set of interrupts for processing by a second set of CPU cores (e.g., CPU cores 402, 404, 406, 408, 410, 412). As discussed above, CPU cores 402, 404, 406, 408, 410, 412 may operate without worry of being interrupted by the first set of interrupts. As will be discussed in greater detail below, polling process 10 may convert 306 the second set of interrupts to a set of polling operations for processing by the second set of CPU cores. Accordingly, the first set of CPU cores (e.g., CPU core 400) may address the limited number of interrupts of the first set of interrupts while the second set of CPU cores (e.g., CPU cores 402, 404, 406, 408, 410, 412) may process the second set of interrupts and the various storage application-based polling operations all as polling operations. In this manner, minimal CPU cores may be assigned 300 for exclusively processing a first set of interrupts.

In some implementations, polling process 10 may process 304 the first set of interrupts using the first set of CPU cores. Referring again to FIG. 4, suppose storage processor 100 receives IO request 414. Polling process 10 may generate an interrupt (e.g., an IO command interrupt 420) for initially processing IO request 414. As discussed above, polling process 10 may assign 300 the first set of interrupts to the first set of CPU cores (e.g., CPU core 400) for exclusive processing. Accordingly, polling process 10 may process 304 interrupt 420 using CPU core 400. As shown in FIG. 4, the arrow leading from buffer 416 and pointing to CPU core 400 may represent processing 304 interrupt 420 on CPU core 400.

In some implementations, polling process 10 may convert 306 the second set of interrupts to a set of polling operations, thus defining a set of converted polling operations. As discussed above, the second set of interrupts may not impact IO latency. Accordingly, polling process 10 may convert 306 the second set of interrupts to a set of polling operations. A polling operation may generally include the process where the CPU core waits for an external device or process to check for its readiness or state. In some implementations, CPU core may poll one or more IO queues for new IO requests to process on a backend (e.g., data array 112). As will be discussed in greater detail below, polling process 10 may convert 306 the second set of interrupts to a set of polling operations. Accordingly, the second set of interrupts may be processed using the second set of CPU cores as a set of polling operations.

Converting 306 the second set of interrupts to a set of polling operations may include preventing 310 the second set of interrupts from being processed as interrupts; and storing 312 each interrupt of the second set of interrupts as a polling operation on one or more buffers. For example, polling process 10 may prevent 310 the second set of interrupts from being processed by an interrupt handling driver as interrupts. As discussed above, as new interrupts are added to a buffer for processing by the interrupt handling driver, polling process 10 may determine whether each interrupt is of the first set of interrupts or the second set of interrupts. In response to determining that an interrupt is part of the second set of interrupts, polling process 10 may prevent 310 the second set of interrupts from being processed by the interrupt handling driver as an interrupt. Polling process 10 may store 312 or retain each interrupt of the second set of interrupts in the one or more buffers for polling-based processing by the second set of CPU cores. In this manner, polling process 10 may convert 306 the second set of interrupts to a set of converted polling operations.

In some implementations, polling process 10 may process 308 the set of converted polling operations using the second set of CPU cores. Referring again to FIG. 4, suppose polling process 10 generates a backend submission command interrupt (e.g., backend submission command interrupt 422) and a transaction completion interrupt (e.g., transaction completion interrupt 424). In this example, polling process 10 may convert 306 backend submission command interrupt 422 and transaction completion interrupt 424 to polling operations by preventing interrupt handling driver 418 from processing the interrupts. Polling process 10 may process 308 the converted polling operations (e.g., polling operations 422, 424) using the second set of CPU cores (e.g., CPU cores 402, 404, 406, 408, 410, 412).

Processing 308 the set of converted polling operations using the second set of CPU cores may include polling 314 the set of converted polling operations from the one or more buffers using the second set of CPU cores. As discussed above, by converting 306 the second set of interrupts to polling operations, the second set of CPU cores may process 308 the converted polling operations in the same manner as storage application-based polling operations. Accordingly, the second set of CPU cores may be utilized without interruption from the second set of interrupts and may be assigned a greater number of CPU cores than in conventional approaches as the number of interrupts to process exclusively is minimized.

When processing 308 the set of converted polling operations, polling process 10 may provide the second set of CPU cores with access to the one or more buffers. For example, as the CPU cores may operate in the user space, the CPU cores may not have access to poll the one or more buffers. Accordingly, polling process 10 may provide an application programming interface (API) to provide the second set of CPU cores with access to the one or more buffers. In one example, an input/output control (IOCTL) may be called upon to access the one or more buffers each time the second set of CPU cores process 308 a converted polling operation. As is known in the art, an IOCTL is a system call for device-specific input/output operations and other operations which cannot be expressed by regular system calls.

Referring again to FIG. 4, polling process 10 may poll 314 the set of converted polling operations from the one or more buffers using the second set of CPU cores. In this example, polling process 10 may poll 314 buffer 416 using CPU core 402 for converted polling operation 422 (e.g., backend submission command interrupt 422) when processing entries of the IO queue. Polling process 10 may poll 314 buffer 416 using CPU core 404 for converted polling operation 424 (e.g., transaction completion interrupt 424) when an IO request is processed. As shown in FIG. 4, the arrow leading from CPU core 402 and pointing to buffer 416 may represent processing 308 interrupt 422 on CPU core 402 as a polling operation. Similarly, the arrow leading from CPU core 404 and pointing to buffer 416 may represent processing 308 interrupt 424 on CPU core 404 as a polling operation. Accordingly, polling process 10 may process 314 the second set of interrupts using the second set of CPU cores as polling operations without increasing IO latency.

As discussed above, the first set of interrupts may include one or more IO command interrupts. However, not all IO commands are latency critical. For example, a write command may require the frontend to perform certain tasks as quickly as possible to write a new IO request. As such, a write command may directly impact IO latency. By contrast, a read command may not directly impact IO latency and may be processed efficiently by polling. Accordingly, polling process 10 may determine 316, using the one or more IO command interrupts, whether an IO command interrupt is associated with a read command or a write command. For example, polling process 10 may receive the IO request and trigger an interrupt to extract the IO request from the buffer.

In response to determining that the IO command interrupt is associated with a read command, polling process 10 may convert 318 the read command interrupt to a polling operation. For example, suppose that polling process 10 receives a read command. In this example, polling process 10 may extract the IO request from the buffer to determine 316 that the IO command interrupt is associated with a read command. In response to determining that the IO command interrupt is associated with a read command, polling process 10 may generate a buffer copy (e.g., buffer copy 428) for storing read command interrupt 426. Accordingly, polling process 10 may convert 318 the read command interrupt (e.g., read command interrupt 426) to a polling operation (e.g., polling operation 430) on buffer copy 428. As discussed above, polling process 10 may process 308 polling operation 430 using the second set of CPU cores (e.g., CPU core 406).

In response to determining that the IO command interrupt is associated with a write command, polling process 10 may process 320 the write command interrupt using the first set of CPU cores. For example, suppose that polling process 10 receives a write command. In this example, polling process 10 may extract the IO request from the buffer to determine 316 that the IO command interrupt is associated with a write command. In response to determining that the IO command interrupt is associated with a write command, polling process 10 may process 320 the write command interrupt using the first set of CPU cores. As discussed above, polling process 10 may process 320 write command interrupt 420 using the first set of CPU cores (e.g., CPU core 400).

Implementations of the present disclosure may allow for significant performance benefits. One example implementation has shown that 75% of the Fibre Channel interrupt-based processing may be converted to polling-based processing without creating a race on CPU cores, thus increasing the flexibility of CPU utilization and therefore performance. For example and as discussed above, conventional approaches may result in too many CPU cores being allocated for processing interrupts while CPU cores assigned to process storage application-based polling operations are bottlenecked and vice versa.

For example, consider a storage processor with e.g., forty CPU cores. The conventional approach would allocate e.g., four CPU cores for processing interrupts and thirty-six CPU cores for processing storage application-based polling operations. Therefore, Fibre Channel communication may be limited by fully utilized CPU cores processing interrupts while CPU cores allocated for processing polling operations being underutilized or vice versa.

In an example implementation of the present disclosure, polling process 10 may assign 300 e.g., only one CPU core for exclusively processing a first set of interrupts that impact IO latency and may assign 302 the remaining e.g., thirty-nine CPU cores for processing the second set of interrupts that are converted to polling operations. In this example, 75% of the interrupt-based processing may be more efficiently utilized by CPU cores assigned to process polling operations.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   assigning a first set of interrupts for exclusive processing by a first set of central processing units (CPU) cores;
   assigning a second set of interrupts for processing by a second set of CPU cores;
   processing the first set of interrupts using the first set of CPU cores;
   converting the second set of interrupts to a set of polling operations, thus defining a set of converted polling operations; and
   processing the set of converted polling operations using the second set of CPU cores.

2. The computer-implemented method of claim 1, wherein converting the second set of interrupts to a set of polling operations includes:
   preventing the second set of interrupts from being processed as interrupts; and
   storing each interrupt of the second set of interrupts as a polling operation on one or more buffers.

3. The computer-implemented method of claim 2, wherein processing the set of converted polling operations using the second set of CPU cores includes polling the set of converted polling operations from the one or more buffers using the second set of CPU cores.

4. The computer-implemented method of claim 1, wherein the first set of interrupts and the second set of interrupts include one or more interrupts associated with Fibre Channel protocol transport layer.

5. The computer-implemented method of claim 4, wherein the first set of interrupts include one or more IO command interrupts.

6. The computer-implemented method of claim 5, further comprising:
   determining, using the one or more IO command interrupts, whether an IO command interrupt is associated with a read command or a write command;
   in response to determining that the IO command interrupt is associated with a read command, converting the read command interrupt to a polling operation; and
   in response to determining that the IO command interrupt is associated with a write command, processing the write command interrupt using the first set of CPU cores.

7. The computer-implemented method of claim 4, wherein the second set of interrupts include at least one of:
   one or more backend submission command interrupts; and
   one or more transaction completion interrupts.

8. A computer program product residing on a non-transitory computer readable medium having a plurality of instructions stored thereon which, when executed by a processor, cause the processor to perform operations comprising:
   assigning a first set of interrupts for exclusive processing by a first set of central processing units (CPU) cores;
   assigning a second set of interrupts for processing by a second set of CPU cores;
   processing the first set of interrupts using the first set of CPU cores;
   converting the second set of interrupts to a set of polling operations, thus defining a set of converted polling operations; and
   processing the set of converted polling operations using the second set of CPU cores.

9. The computer program product of claim 8, wherein converting the second set of interrupts to a set of polling operations includes:
   preventing the second set of interrupts from being processed as interrupts; and
   storing each interrupt of the second set of interrupts as a polling operation on one or more buffers.

10. The computer program product of claim 9, wherein processing the set of converted polling operations using the second set of CPU cores includes polling the set of converted polling operations from the one or more buffers using the second set of CPU cores.

11. The computer program product of claim 8, wherein the first set of interrupts and the second set of interrupts include one or more interrupts associated with Fibre Channel protocol transport layer.

12. The computer program product of claim 11, wherein the first set of interrupts include one or more IO command interrupts.

13. The computer program product of claim 12, wherein the operations further comprise:
   determining, using the one or more IO command interrupts, whether an IO command interrupt is associated with a read command or a write command;
   in response to determining that the IO command interrupt is associated with a read command, converting the read command interrupt to a polling operation; and
   in response to determining that the IO command interrupt is associated with a write command, processing the write command interrupt using the first set of CPU cores.

14. The computer program product of claim 11, wherein the second set of interrupts include at least one of:
   one or more backend submission command interrupts; and
   one or more transaction completion interrupts.

15. A computing system comprising:
   a memory; and
   a processor configured to assign a first set of interrupts for exclusive processing by a first set of central processing units (CPU) cores, wherein the processor is further configured to assign a second set of interrupts for processing by a second set of CPU cores, wherein the processor is further configured to process the first set of interrupts using the first set of CPU cores, wherein the processor is further configured to convert the second set of interrupts to a set of polling operations, thus defining a set of converted polling operations, and wherein the processor is further configured to process the set of converted polling operations using the second set of CPU cores.

16. The computing system of claim 15, wherein converting the second set of interrupts to a set of polling operations includes:
   preventing the second set of interrupts from being processed as interrupts; and
   storing each interrupt of the second set of interrupts as a polling operation on one or more buffers.

17. The computing system of claim 16, wherein processing the set of converted polling operations using the second set of CPU cores includes polling the set of converted polling operations from the one or more buffers using the second set of CPU cores.

18. The computing system of claim 15, wherein the first set of interrupts and the second set of interrupts include one or more interrupts associated with Fibre Channel protocol transport layer.

19. The computing system of claim 18, wherein the first set of interrupts include one or more IO command interrupts.

20. The computing system of claim 18, wherein the second set of interrupts include at least one of:
   one or more backend submission command interrupts; and
   one or more transaction completion interrupts.

* * * * *